(12) United States Patent
Mitra et al.

(10) Patent No.: US 9,916,258 B2
(45) Date of Patent: Mar. 13, 2018

(54) RESOURCE EFFICIENT SCALE-OUT FILE SYSTEMS

(75) Inventors: Soumyadeb Mitra, San Jose, CA (US);
Windsor W. Hsu, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 905 days.

(21) Appl. No.: 13/077,779

(22) Filed: Mar. 31, 2011

(65) Prior Publication Data

US 2012/0254257 A1 Oct. 4, 2012

(51) Int. Cl.
*G06F 12/12* (2016.01)
*G06F 9/50* (2006.01)
*G06F 12/0846* (2016.01)
*G06F 17/30* (2006.01)

(52) U.S. Cl.
CPC .......... *G06F 12/12* (2013.01); *G06F 9/5022* (2013.01); *G06F 9/5016* (2013.01); *G06F 12/0846* (2013.01); *G06F 17/30129* (2013.01)

(58) Field of Classification Search
CPC combination set(s) only.
See application file for complete search history.

(56) References Cited

U.S. PATENT DOCUMENTS

| | | | |
|---|---|---|---|
| 7,003,639 B2 | 2/2006 | Tsern et al. | |
| 7,584,338 B1 | 9/2009 | Bricker et al. | |
| 7,653,699 B1* | 1/2010 | Colgrove | G06F 17/30067 709/213 |
| 7,747,584 B1 | 6/2010 | Jernigan | |
| 8,060,481 B1 | 11/2011 | Harmer et al. | |
| 8,209,680 B1* | 6/2012 | Le et al. | 717/174 |
| 8,478,936 B1 | 7/2013 | Todd et al. | |
| 2002/0144044 A1* | 10/2002 | Moon | G06F 3/0607 710/302 |
| 2002/0165911 A1* | 11/2002 | Gabber | G06F 17/30902 709/203 |
| 2003/0163509 A1* | 8/2003 | McKean et al. | 709/100 |
| 2004/0172458 A1* | 9/2004 | Pitts | 709/213 |
| 2004/0230739 A1* | 11/2004 | Tsern | G06F 1/3203 711/105 |
| 2006/0101085 A1* | 5/2006 | Soulier | G06F 17/30191 |

(Continued)

FOREIGN PATENT DOCUMENTS

CN 101137981 A 3/2008
WO WO 2008/097097 A1 8/2008

OTHER PUBLICATIONS

International Search Report and Written Opinion, Application No. PCT/US12/28037, dated Jun. 4, 2012, 7 pages.

(Continued)

*Primary Examiner* — Mark D Featherstone
*Assistant Examiner* — Diedra McQuitery
(74) *Attorney, Agent, or Firm* — Womble Bond Dickinson (US) LLP

(57) ABSTRACT

According to one embodiment, a file system (FS) of a storage system is partitioned into a plurality of FS partitions, where each FS partition stores segments of data files. In response to an input and output (IO) request for accessing a first of the FS partitions, a second of the FS partitions is selected that is currently in a ready state for access. The second FS partition is then removed from the ready state for access. The first FS partition is brought into a ready state for access.

27 Claims, 13 Drawing Sheets

(56) References Cited

U.S. PATENT DOCUMENTS

| | | | |
|---|---|---|---|
| 2006/0190932 A1* | 8/2006 | Gilbert | 717/140 |
| 2006/0212746 A1 | 9/2006 | Amegadzie et al. | |
| 2006/0294163 A1 | 12/2006 | Armangau et al. | |
| 2007/0016726 A1* | 1/2007 | Zohar et al. | 711/114 |
| 2007/0198550 A1 | 8/2007 | Irving et al. | |
| 2007/0219816 A1* | 9/2007 | Van Luchene et al. | 705/1 |
| 2008/0065587 A1* | 3/2008 | Iwasaki | G06F 3/0614 |
| 2008/0168223 A1 | 7/2008 | Reeves et al. | |
| 2008/0172424 A1 | 7/2008 | Kawamura | |
| 2008/0270729 A1 | 10/2008 | Reddy et al. | |
| 2009/0106255 A1* | 4/2009 | Lacapra et al. | 707/10 |
| 2009/0327357 A1 | 12/2009 | Beglin et al. | |
| 2010/0011185 A1 | 1/2010 | Inoue et al. | |
| 2010/0082700 A1 | 4/2010 | Parab | |
| 2010/0169591 A1 | 7/2010 | Atluri et al. | |
| 2010/0246578 A1 | 9/2010 | Zhong et al. | |
| 2010/0250540 A1 | 9/2010 | Adda et al. | |
| 2010/0280995 A1 | 11/2010 | Munegowda et al. | |
| 2010/0313040 A1 | 12/2010 | Lumb | |
| 2010/0332452 A1* | 12/2010 | Hsu | G06F 17/30156 707/640 |
| 2011/0035357 A1 | 2/2011 | Ting et al. | |
| 2011/0047132 A1 | 2/2011 | Kilday et al. | |
| 2011/0066628 A1 | 3/2011 | Jayaraman | |
| 2011/0106770 A1 | 5/2011 | McDonald et al. | |
| 2011/0106862 A1* | 5/2011 | Mamidi et al. | 707/823 |
| 2011/0191522 A1* | 8/2011 | Condict | G06F 12/123 711/103 |
| 2011/0276744 A1* | 11/2011 | Sengupta | G06F 12/0866 711/103 |
| 2012/0011176 A1 | 1/2012 | Aizman | |
| 2012/0158803 A1* | 6/2012 | Kandasamy | G06F 17/30 707/822 |
| 2012/0166401 A1 | 6/2012 | Li et al. | |

OTHER PUBLICATIONS

International Search Report and Written Opinion, Application No. PCT/US12/28041, dated Jun. 4, 2012, 6 pages.
International Preliminary Report on Patentability, Application No. PCT/US2012/028037, dated Oct. 1, 2013, 5 pages.
International Preliminary Report on Patentability, Application No. PCT/US2012/028041, dated Oct. 1, 2013, 6 pages.
Non-Final Office Action, U.S. Appl. No. 13/077,775, dated Mar. 26, 2014, 17 pages.
Non-Final Office Action, U.S. Appl. No. 13/077,775, dated Feb. 26, 2015, 14 pages.
U.S. Appl. No. 13/077,775, Final Office Action, dated Sep. 23, 2014, 15 pages.
Extended European Search Report, Application No. 12764154.6, dated Jun. 19, 2015, 7 pages.
Extended European Search Report, Application No. 12765938.1, dated Apr. 20, 2015, 8 pages.

\* cited by examiner

| | | |
|---|---|---|
| mode_t | st_mode; | /* protection */ |
| uid_t | st_uid; | /* user ID of owner */ |
| gid_t | st_gid; | /* group ID of owner */ |
| off_t | st_size; | /* total size, in bytes */ |
| time_t | st_atime; | /* time of last access */ 901 |
| time_t | st_mtime; | /* time of last modification */ 902 |
| time_t | st_ctime; | /* time of last status change */ 903 |

RESOURCE EFFICIENT SCALE-OUT FILE SYSTEMS

RELATED APPLICATIONS

This application is related to co-pending U.S. patent application Ser. No. 13/077,775, entitled "Time-Based Data Partitioning" filed Mar. 31, 2011, which is incorporated by reference herein in its entirety.

FIELD OF THE INVENTION

Embodiments of the present invention relate generally to file systems of a storage system. More particularly, embodiments of the invention relate to efficiently managing resources of file systems.

BACKGROUND

There is an ever increasing demand for building larger storage systems, driven by primary data growth and by the advent of new workloads such as disk-based backup. Backups which were traditionally stored on tapes are now being stored on disk-based storage systems for better performance and cost effectiveness. Such backup systems have huge footprints often several times larger than traditional primary storage systems and yet are unable to meet the requirements of the biggest enterprise customers.

Unfortunately, scaling file system capacity is not a trivial problem particularly for de-duplicated systems because of their huge memory requirements. De-duplicated file systems maintain some metadata in memory for every block of physical data. This metadata overhead ranges from few bits per block for optimized file systems to over a dozen bytes for more rudimentary implementations. It is not trivial to add memory to a system to scale with capacity. Traditional server class motherboards have limits on the amount of memory that can be attached to them. Main memory is also a "premium" resource; not only is it one of the most expensive components in the system, it is often one of the most energy consuming one. Hence there is always the need to reduce the memory footprint of a file system.

BRIEF DESCRIPTION OF THE DRAWINGS

Embodiments of the invention are illustrated by way of example and not limitation in the figures of the accompanying drawings in which like references indicate similar elements.

FIG. 9 is a diagram illustrating an example of an inode of a typically file system.

DETAILED DESCRIPTION

Figure 1:
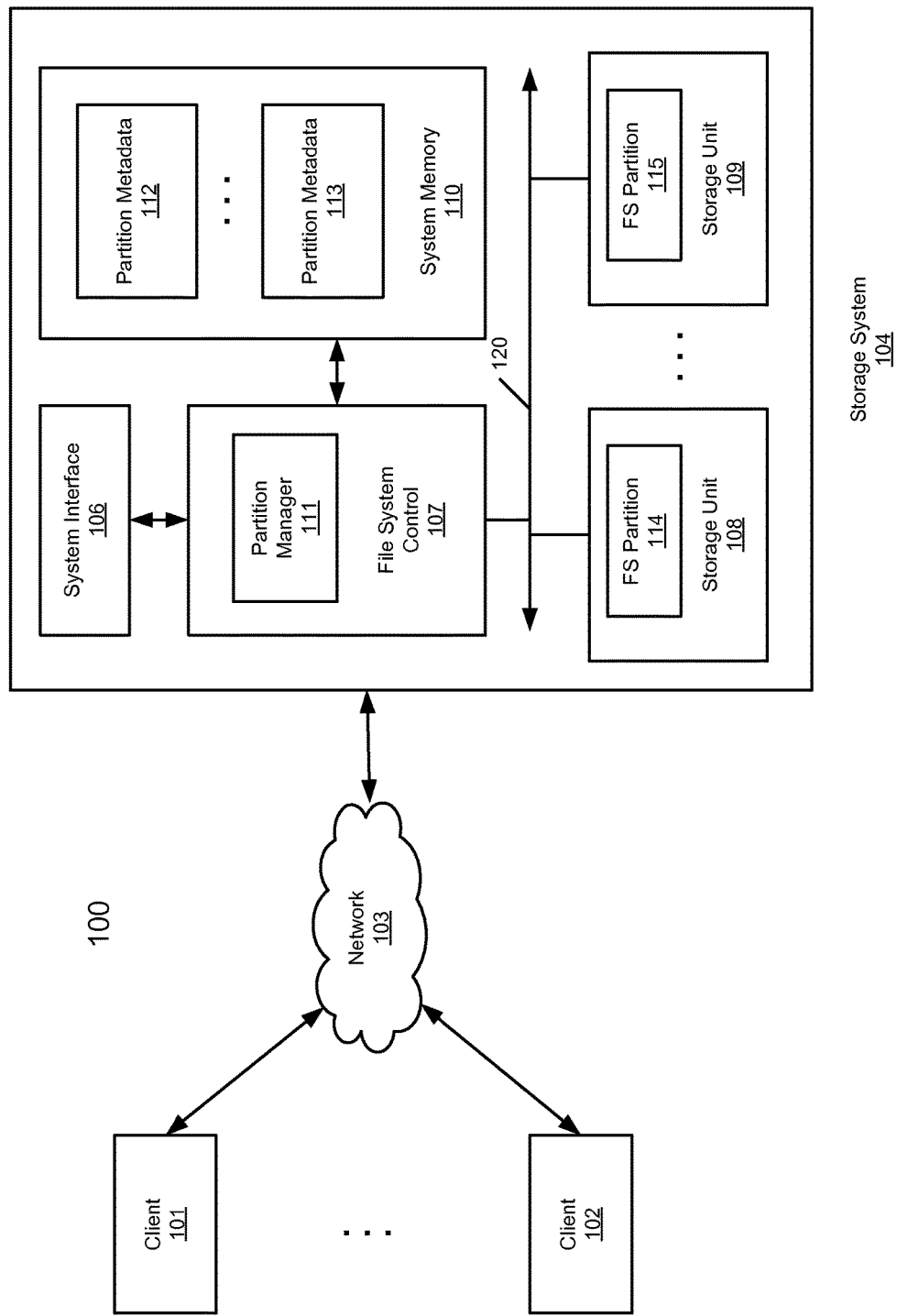
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a file system is partitioned into multiple file system partitions. The file system partitions are hosted within a storage system and share the system memory of the storage compute node. Each of the file system partitions may be stored in one of multiple storage units of the storage system. Each of the file system partitions includes metadata having enough information to identify itself in a single larger logical file system represented by the file system partitions. Such metadata also include enough information to allow access to its associated data. Each of the file system partitions can be swapped into the system memory when it is being accessed. Similarly, each of the file system partitions can be swapped out of the system memory when it is not being accessed.

In one embodiment, file system partitions are swapped in and out of the memory according to a scheduling or eviction algorithm which ensures that once a partition is loaded in memory, enough IO requests are executed on the file system partitions before it is considered for swapping out. This ensures that the cost of swapping partitions is amortized across multiple IO operations. Even if there are not enough currently pending IO requests, the scheduling algorithm keeps the file system partition loaded in anticipation of potential future IO operations. The scheduling algorithm is also fair and starvation free.

In one embodiment, the file system is partitioned in a way to ensure that there is strong input and output (IO) locality, i.e., IO requests are only directed to one or few file system partitions at a given time. In one embodiment, files are grouped into partitions based on a time attribute of the files, such as, for example, the time when they were last modified. This partitioning scheme provides better IO locality for long term backup and archival workloads. Since a file is generally a locality domain (e.g., applications usually access parts or whole of a file), by storing the entire contents of files in one file system partition, it reduces a number of file system partition swaps for accessing a file.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as the de-duplication storage systems available from EMC® Corporation of Hopkinton, Mass.

In one embodiment, storage system 104 includes, but is not limited to, system interface 106, file system control 107, and one or more storage units 108-109 communicatively. A file system of storage system 104 may be partitioned into multiple file system partitions, where each of the file system partitions may be stored in one of storage units 108-109. Storage units 108-109 may be communicatively coupled to each other via interconnect or bus 120, where storage units 108-109 may be physical and/or logical storage units or volumes. In one embodiment, a first of storage units 108-109 operates as an active storage to store external or fresh user data, while a second of storage units 108-109 operates as a target storage to periodically archive or transfer data from the active storage according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In one embodiment, storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers comprise different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, the file system is partitioned into multiple file system partitions 114-115, where each file system partition may be stored in one of storage units 108-109 of storage system 104. Each of file system partitions 114-115 includes metadata having enough information to identify itself in a single larger logical file system represented by file system partitions 114-115. Such metadata also include enough information to allow access to its associated data.

In response to a data file to be written in partitions 114-115, a segment storage engine (not shown) is configured to segment the data file into multiple segments according to a variety of segmentation policies or rules. File system control 107 may be implemented as part of the segment storage engine. The segment storage engine only stores a segment in a partition if the segment has not been previously stored in the partition. In the event that a segment has been previously stored, metadata stores information enabling the reconstruction of a file using the previously stored segment. As a result, segments of data files are stored in a deduplicated manner, either within each partition 114-115 or across at least some of partitions 114-115. In addition, metadata is added to at least some of partitions 114-115, such that the file can be accessed independent of another partition. Data stored in the partition may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different partitions may use different compressions (e.g., main or active partition from other partitions, one partition from another partition, etc.).

Metadata of each partition includes enough information to provide access to the files it contains. When an active partition fails, metadata contained in another partition may be utilized to recover the active partition. When one partition is unavailable (e.g., the underlying storage unit has failed, or is being upgraded, etc.), the system remains up and running to provide access to any file not stored in the failed partition. When a file is deleted, the metadata associated with the files in the system is updated to reflect that the file has been deleted.

In one embodiment, the metadata information includes a file name, a partition where the segments associated with the file name are stored, reconstruction information for the file using the segments, and any other appropriate metadata information. In one embodiment, a copy of the metadata is stored on a partition for files stored on that partition so that files that are stored on the partition can be accessed using only the information stored on the partition. In one embodiment, a main set of metadata information can be reconstructed by using information of all partitions associated with the storage system in the event that the main metadata is lost, corrupted, damaged, etc. Metadata for a partition can be reconstructed using metadata information stored on a main partition or other partition or partitions (e.g., replica partition). Metadata information further includes index information (e.g., location information for segments in storage units). In one embodiment, metadata includes prime segment information that can be used to provide a consistent point of a file system and/or reconstruct a file system in the event of file system failure.

Referring back to FIG. 1, each of file system partitions 114-115 can be swapped by partition manager 111 of file system control 107 into system memory 110 when it is being accessed. Similarly, each of the file system partitions can be swapped out of system memory 110 by partition manager 111 when it is not being accessed. As a result, the file system partitions can be accessed using a limited amount of memory. Practically, when a file system partition is swapped into system memory 110, its metadata (e.g., metadata 112-113) is actually swapped into system memory 110, such that the data of the corresponding file system partition can be accessed. Throughout this application, for the purposes of illustration, when a file system partition is swapped in and out of the memory, it refers to swapping the associated metadata in and out of the memory.

In one embodiment, file system partitions 108-109 are swapped in and out of the memory 120 according to a scheduling or eviction algorithm which ensures that once a partition is loaded in memory 120, enough IO requests are executed on the file system partitions before it is considered for swapping out. This ensures that the cost of swapping partitions is amortized across multiple IO operations. Even if there are not enough currently pending IO requests, the scheduling algorithm keeps the file system partition loaded in anticipation of potential future IO operations. The scheduling algorithm is also fair and starvation free.

In one embodiment, the file system is partitioned in a way to ensure that there is strong input and output (TO) locality, i.e., IO requests are only directed to one or few file system partitions at a given time. In one embodiment, files are grouped into partitions based on a time attribute of the files, such as, for example, the time when they were last modified. This partitioning scheme provides better IO locality for long term backup and archival workloads. Since a file is generally a locality domain (e.g., applications usually access parts or whole of a file), by storing the entire contents of files on one file system partition, it reduces a number of file system partition swaps for accessing a file.

Figure 2:
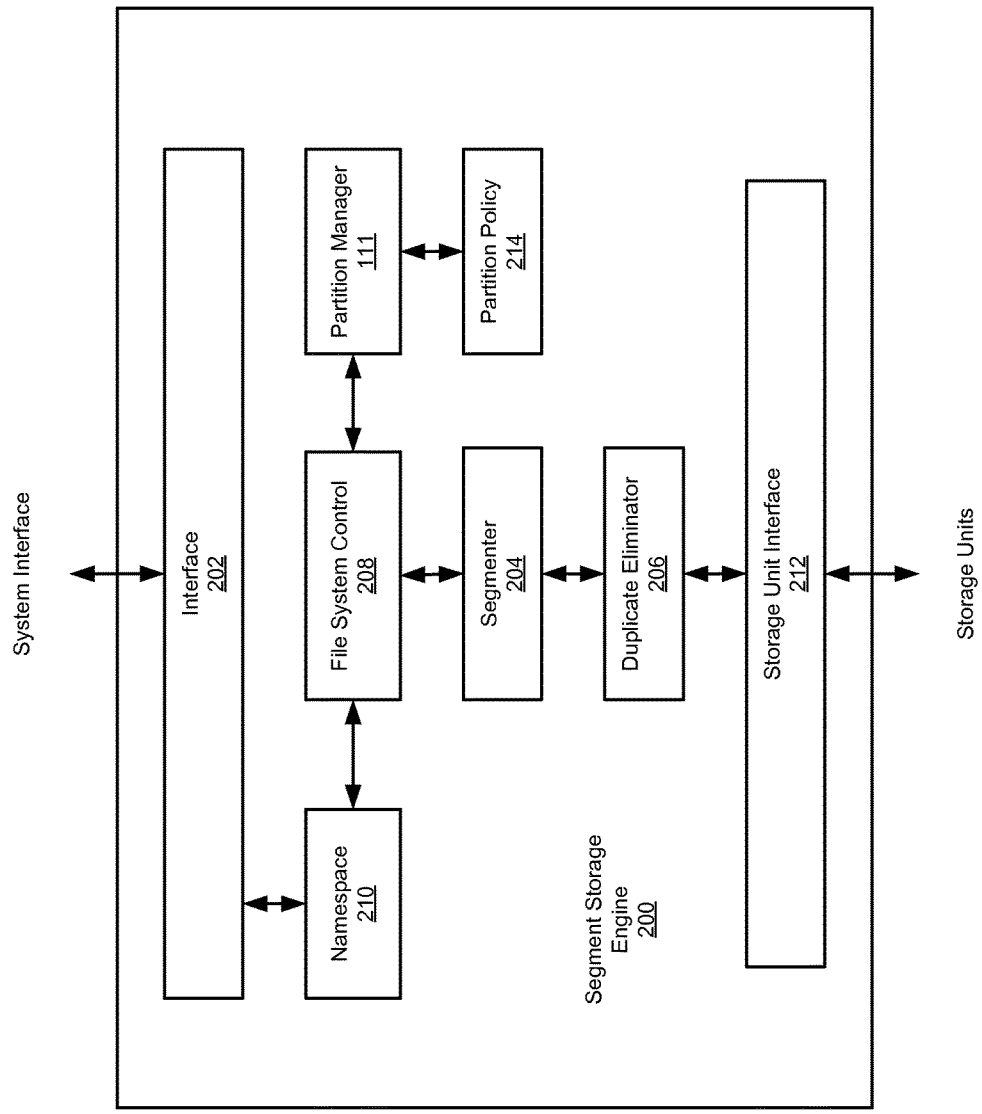
FIG. 2 is a block diagram illustrating a segment storage engine according to one embodiment of the invention.

FIG. 2 is a block diagram illustrating a segment storage engine according to one embodiment of the invention. Note that for purposes of illustration only, certain reference numbers for certain components having the same or similar functionalities from the previous figures or description may be retained the same. Referring to FIG. 2, in one embodiment, segment storage engine 200 includes interface 202, segmenter 204, duplicate eliminator 206, file system control 208, namespace 210, and partition interface 212. File system control 208 may be implemented as part of file system control 107 of FIG. 1. Segment storage engine 200 receives data item(s) via interface 202. The data item(s) or file(s) is/are processed by segmenter 204 and file system control 208. Segmenter 204 breaks the data item(s) into segments based on a variety of rules or considerations. For example, the data item(s) may be broken into segments by identifying segment boundaries using a content-based technique (e.g., a function is calculated at various locations of a data item, when the function is equal to a value or when the value is a minimum, a maximum, or other value relative to other function values calculated for the data item), a non-content-based technique (e.g., based on data item property for example, byte length, title, creation date), or any other appropriate technique. In one embodiment, a segment is restricted to a minimum and/or maximum length, to a minimum or maximum number of segments per data item, or any other appropriate limitation.

In one embodiment, file system control 208 processes information to indicate the segment(s) association with a data item. In some embodiments, a list of fingerprints is used to indicate segment(s) associated with a data item. File system control 208 passes segment association information to an index (not shown). The index is used to locate stored segments in partition(s) via partition interface 212. Duplicate eliminator 206 identifies whether a newly received segment has already been stored in partition(s). In the event that a segment has already been stored in partition(s), a reference to the previously stored segment is stored instead of storing the newly received segment.

Interface 202 is configured to receive a request to retrieve a data item. Interface 202 communicates with file system 208 via namespace 210 to identify appropriate segments stored in partitions via partition interface 212. File system 208 communicates with the index to locate appropriate segments stored in partitions via partition interface 212. Appropriate segments are used to construct the requested data item. The data item is provided via interface 202 in response to the request. In one embodiment, file system 208 and/or the index use(s) a tree of content-based identifiers (e.g., fingerprints) to associate a file with data segments and their locations in partition(s). In the event that a segment associated with a given file or data item changes, the content-based identifiers (IDs) will change and the changes will ripple from the bottom to the top of the tree associated with a file name (or directory structure) efficiently since the appropriate content-based IDs are easily identified using the tree structure.

In one embodiment, file system engine 107 further includes a partition manager 111 configured to partition a file system into multiple file system (FS) partitions according to at least one partition policy 214 and to manage resources consumed by the FS partitions based on the partition policy 214. For example, partition policy 214 may include an eviction algorithm or swapping scheme to swap an FS partition in and out of the system memory. In one embodiment, when a first FS partition is not being accessed, the first FS partition may be swapped out of the memory to make room for a second FS partition that is to be accessed. As a result, the file system partitions can be accessed using a limited amount of memory. Note that some or all of the components as shown in FIGS. 1-2 may be implemented in software, hardware, or a combination of both.

Figure 3:
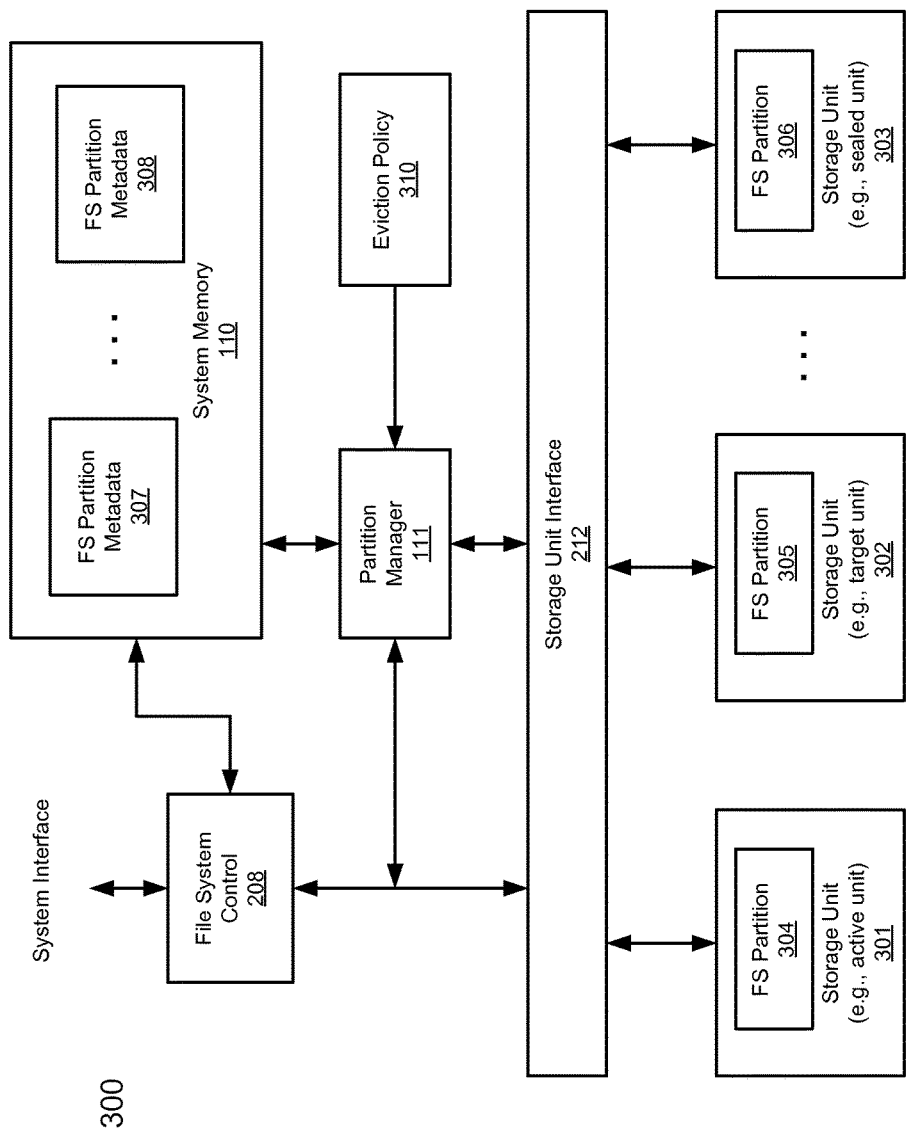
FIG. 3 is a block diagram illustrating a storage system according to one embodiment of the invention.

FIG. 3 is a block diagram illustrating a storage system according to one embodiment of the invention. For example, system 300 may be implemented as part of storage system 104 of FIG. 1. Referring to FIG. 3, storage units 301-303 may represent at least part of storage units 108-109 of FIG. 1. Storage units 301-303 may be implemented within a single computing node. Each of storage units 301-303 is identified by a storage unit ID that uniquely identifies the corresponding storage unit. Storage units 301-303 may be physical and/or logical storage units or volumes.

According to one embodiment, system 300 represents an archiving storage system. During normal operations, external or fresh user data is written to a first partition, in this example, partition 304, which is also referred to as an active partition or main partition. Periodically, data stored in the first partition is migrated to a second partition, in this example, partition 305, which is also referred to as a target partition. When the second partition has been filled up to a predetermined threshold, the target partition is sealed to become an archive partition, in this example, partition 306, which may be a read-only partition. Another partition may then be allocated and designated as a new target partition to archive further data from the active partition.

Data migration may be performed according to a variety of data migration policies. According to some embodiments, the files are stored as one or more segments, where the segments are deduplicated (e.g., only one copy is stored and is/can be used to reconstruct more than one file) in the storage system (e.g., deduplicated within one partition of the system). Segments are stored in a main or active partition (e.g., partition 301) and periodically (e.g., every week), based on a transfer protocol (e.g., partition is above a capacity limit, a number of segments every hour, when inactive, etc.), or when the partition is full or meets one or more conditions (e.g., is 80% full, is less than 20% active, has had no accesses in last hour, etc.), segments belonging to files identified based on a migration policy (e.g., files of a certain file type that have not been modified or accessed for a predetermined period of time are to be migrated, etc.) are transferred to a second partition (e.g., partition 302).

As the second partition is filled, metadata is transferred to the second partition so that the second partition has all the necessary information to access files in the second partition. The metadata enables the system to reconstruct files that are stored in the system (e.g., in the whole system, in a partition, etc.) and/or associated files that are stored in the system with their file names. This also allows the system to power down or to reduce power of a storage unit of the partition for energy conservation or to take a partition off-line to upgrade a partition or to enable the system to be fault tolerant in that the system can operate if any given partition fails. When a partition fills, the system transfers segments from the main partition to another partition. The system can be expanded by adding partitions incrementally. Files can be accessed using the single name space providing an easy to use interface. Hardware may be efficiently used as only one deduplicating engine is used for multiple partitions.

In one embodiment, a file is identified by a name that is independent of the partition the file is stored in. When a file is received to be stored, a name is also received to be associated with the file. When a request to read a file is received, a name is also received. The system looks up the metadata associated with the files in the system to identify the file associated with the received name. It then looks up the metadata associated with the identified file to determine the partition in which the identified file is stored. In one embodiment, the metadata associated with the files in the system may be maintained in a main or active partition. Alternatively, the metadata may be maintained in each partition where the files associated with the metadata are stored. In addition, the metadata may be maintained in a distributed and/or redundant manner across many partitions (e.g., for fault tolerance). Furthermore, the metadata may be maintained in a separated partition or partition, or any other appropriate storage location.

In some embodiments, updates to the metadata associated with the files are made only to the copy of the metadata stored in the active partition. When the active partition fails, the system uses the metadata contained in other attached partitions (e.g., a previously active partition) to provide access to the files still in the system. In one embodiment, when a partition is unavailable (e.g. the underlying storage unit has failed, is being upgraded, etc.), the system remains up and running to provide access to any file not stored in the failed partition.

Referring back to FIG. 3, in one embodiment, each of partitions 301-303 may store data representing a portion or partition of a file system that has been partitioned into multiple partitions 304-306, where file system partitions 304-306 collectively represent a single larger logical file system of storage system 300 (also referred to as a collection of file system partitions or a file system collection). File system partitions 304-306 are hosted within storage system 300 as a single computing node and share system memory 110. Each of the file system partitions includes metadata (not shown) having enough information to identify itself in a single larger logical file system (e.g., file system collection) represented by the file system partitions. Such metadata also include enough information to allow access to its associated data.

According to one embodiment, each FS partition of the collection file system contains metadata having enough information that enables the corresponding partition to be individually identifiable and configured. Some information is specific to the FS partition and part of the information pertains to the entire FS collection. In one embodiment, the FS collection specific information stored in the active and archive partitions may be different, while the FS partition specific information may be similar.

In one embodiment, FS partition metadata that is specific to an FS partition includes, but is not limited to, at least some of unique name of the partition, version of the partition, access state of the partition, associated container set ID, a partition universally unique identifier (UUID), an originator UUID, a non-volatile random-access memory (NVRAM) ID, a partition runtime state, and a partition sealed state.

The access state of an FS partition could be one of ENABLED, DISABLED, or PROBLEM. The container set ID includes a name of the container set within the associated FS partition, where the container set holds all the data of the FS partition. A partition UUID of an FS partition uniquely identifies the corresponding FS partition. An originator UUID uniquely identifies the originator of this partition and can be used for replication purposes. A NVRAM ID is used to identify the associated NVRAM area for the corresponding partition. A partition runtime state contains information indicating a runtime state of the partition. The partition runtime state can be one of initializing, recovering NVRAM, ready (e.g., has been mounted), opened, checking (e.g., an offline tool is accessing the partition), checked (e.g., an offline tool has completed access of the partition), unmounted, and destroyed. A partition sealed state indicates whether the corresponding partition has been sealed. If the partition has been sealed, no further write access can be performed on the partition.

In one embodiment, the above information maintained in each archive partition can be used to uniquely determine each archive partition independently. If the partition is healthy, the file system can bring the partition online. If the file system determines that the partition is not healthy, it can mark and keep the partition offline and/or put the partition in a problem state. As a result, the file system can remain online as long as the active partition is healthy. One or more archive partitions may be damaged but the file system remains available.

In addition, each FS partition further includes some metadata related to the entire file system collection. In one embodiment, such metadata includes, but is not limited to, collection partition type (e.g., active, target, or archive) and collection ID that uniquely identifies the collection of which the corresponding partition is a member. Further, metadata in each of the archive FS partitions further includes a header having a version number, sequence number, and a checksum value and a partition table. The partition table includes a collection ID identifying a file system collection of which the associated partition is a member, a number of partitions in the collection, UUIDs of all archive partitions in the collection, and a prime or prime segment representing a consistent point of the file system collection.

In one embodiment, the above information kept in the Active partition helps to identify all the different partitions of the collection (file system). The file system uses this information to discover all the partitions and tries to bring them online. However, if the active partition is corrupted, the collection information is not available and the file system cannot be brought online immediately. This collection information must then be assembled by probing all the archive partitions available on the system. The archive partitions will identify themselves as part of a collection and this information from archive partitions can be used to recreate the collection information of the active partition.

In one embodiment, each of the file system partitions can be swapped into system memory 110 by partition manager 111 when it is being accessed. Similarly, each of the file system partitions can be swapped out of the system memory by partition manager 111 when it is not being accessed. In this example, it is assumed that there are only two memory slots 307-308 allocated from memory 110 for FS partitions and there are three FS partitions 304-306. Initially, metadata of FS partitions 304-305 are loaded in memory 110 as part of metadata 307-308, respectively. Subsequently, when a request for accessing data stored in FS partition 306 is received, one of FS partitions 304-305 that is not being accessed at the moment is identified and unloaded from memory 110, such that metadata of partition 306 can be loaded into the same memory slot without having to allocate an additional memory slot. As a result the memory usage footprint can be greatly reduced.

Figure 4:
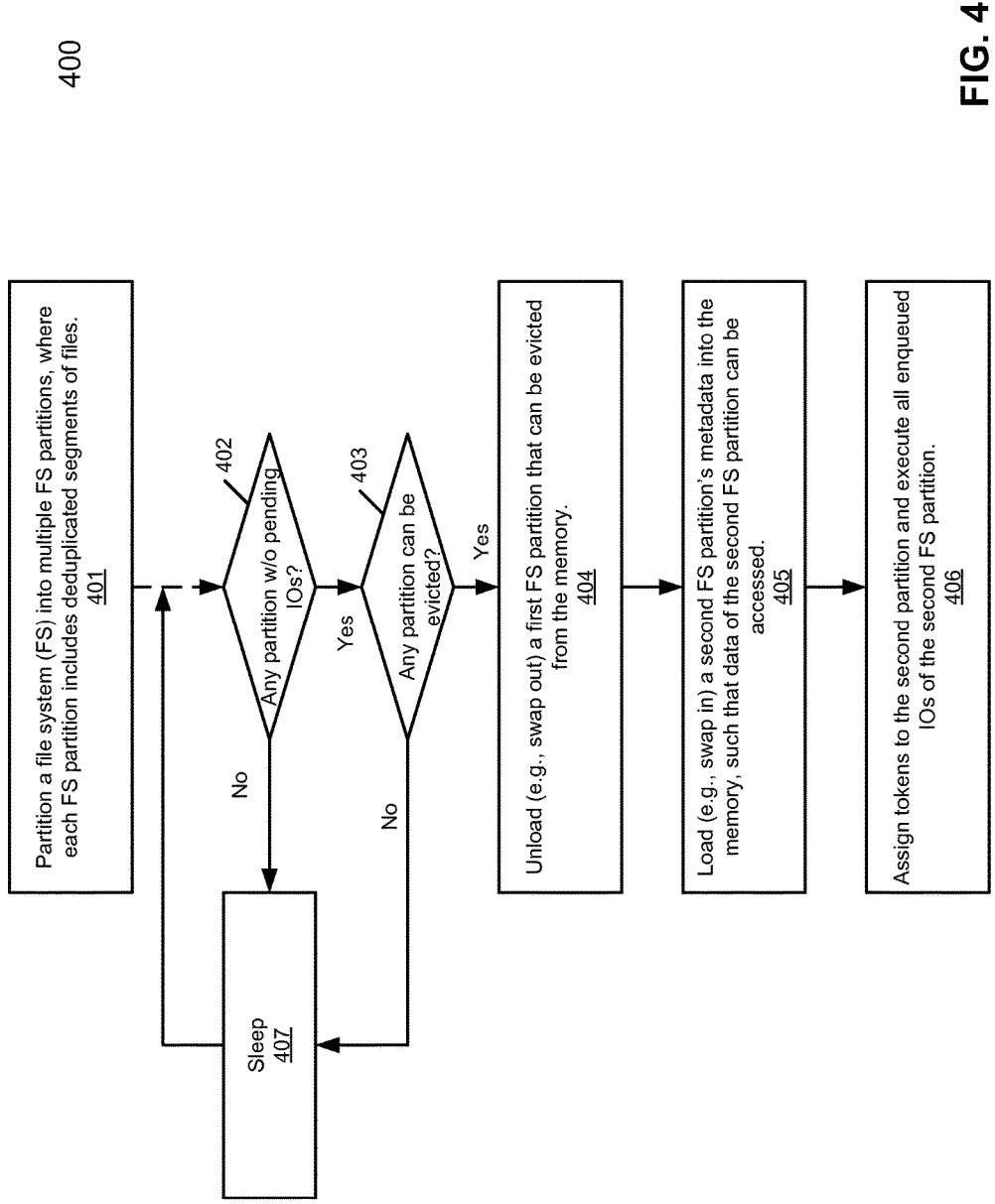
FIG. 4 is a flow diagram illustrating a method for managing resource of a storage system according to one embodiment of the invention.

FIG. 4 is a flow diagram illustrating a method for managing resource of a storage system according to one embodiment of the invention. Method 400 may be performed by system 300 of FIG. 3. Referring to FIG. 4, at block 401, a file system of a storage system is partitioned into multiple FS partitions. Each FS partition includes deduplicated segments of files. Subsequently, at block 402, it is determined whether there is any FS partition without having any pending IO request. If not, the processing thread enters into a sleep state at block 407. If there is at least one FS partition without having any pending IO request, at block 403, it is determined whether the at least one FS partition can be evicted, for example, according to a file system eviction policy. If so, at block 404, a first FS partition that can be evicted is unloaded (e.g., swapped out) from the memory to make room for a second FS partition. At block 405, the second FS partition is loaded (e.g., swapped in) into the memory, such that data of the second FS partition can be accessed without having to allocating additional memory. In one embodiment, the second FS partition is loaded into the same memory slot from which the first FS partition has been swapped out. At block 406, optionally tokens are assigned to the second FS partition and any pending IO requests that have been enqueued for the second FS partition are executed.

Having the right data partition is a necessary condition but is not a sufficient condition to reduce the number of partitions swapped in and out of memory 310. A file system often has to serve simultaneous requests from different users and/or hosts and these individual IO requests may be independent from each other. For example, in a backup scenario, one host might be doing a backup and hence accessing a partition which holds the recent data, while another host might be running a regulatory enquiry on historical data and hence accessing a different partition. It is possible that although the best data partitioning scheme is in placed where an individual IO source only accesses one partition; however, FS partitions may still be swapped in and out as the system has to juggle amongst independent IO requests.

Referring back to FIG. 3, in one embodiment, file system partitions are swapped in and out of the memory region by partition manager 111 according to a scheduling or eviction algorithm 310 to ensure that once a partition is loaded in memory and enough IO requests are executed on the file system partitions before it is considered for swapping out. This ensures that the cost of swapping partitions is amortized across multiple IO operations. Even if there are not enough currently pending IO requests, the scheduling algorithm keeps the file system partition loaded in anticipation of potential future IO operations. The scheduling algorithm is also fair and starvation free.

In one embodiment, eviction policy 310 is a token-based eviction policy. The basic theory behind the token-based scheduling is to assign tokens (with an initial value) to FS partitions when they are loaded in memory. Tokens determine for how long partitions can stay in memory before they can be swapped out. In one embodiment, tokens are consumed or deducted every time an IO request (at the granularity of batches) is executed on the associated FS partition. Tokens are also taken away periodically at fixed time intervals. After an FS partition has used up all its tokens, it is considered as a candidate for swapping out.

A token-based eviction policy guarantees that an FS partition is not swapped out too soon after it is loaded. Rather, its token count must reach zero before it can be considered for replacement. Hence, an FS partition receives the opportunity to service at least some IO requests while it is loaded. In addition, deducting tokens periodically guarantees that an FS partition will always run out of tokens and will be considered for swapping out. This prevents starvation scenarios. An FS partition which is waiting for being loaded in memory will always find some other FS partitions running out of tokens and getting evicted. According to one embodiment, when the token count of an FS partition reaches zero, if there is no pending IO request for the FS partition, the FS partition is swapped out; otherwise, the FS partition remains in the memory until the pending IO request or requests have been executed.

Figure 5:
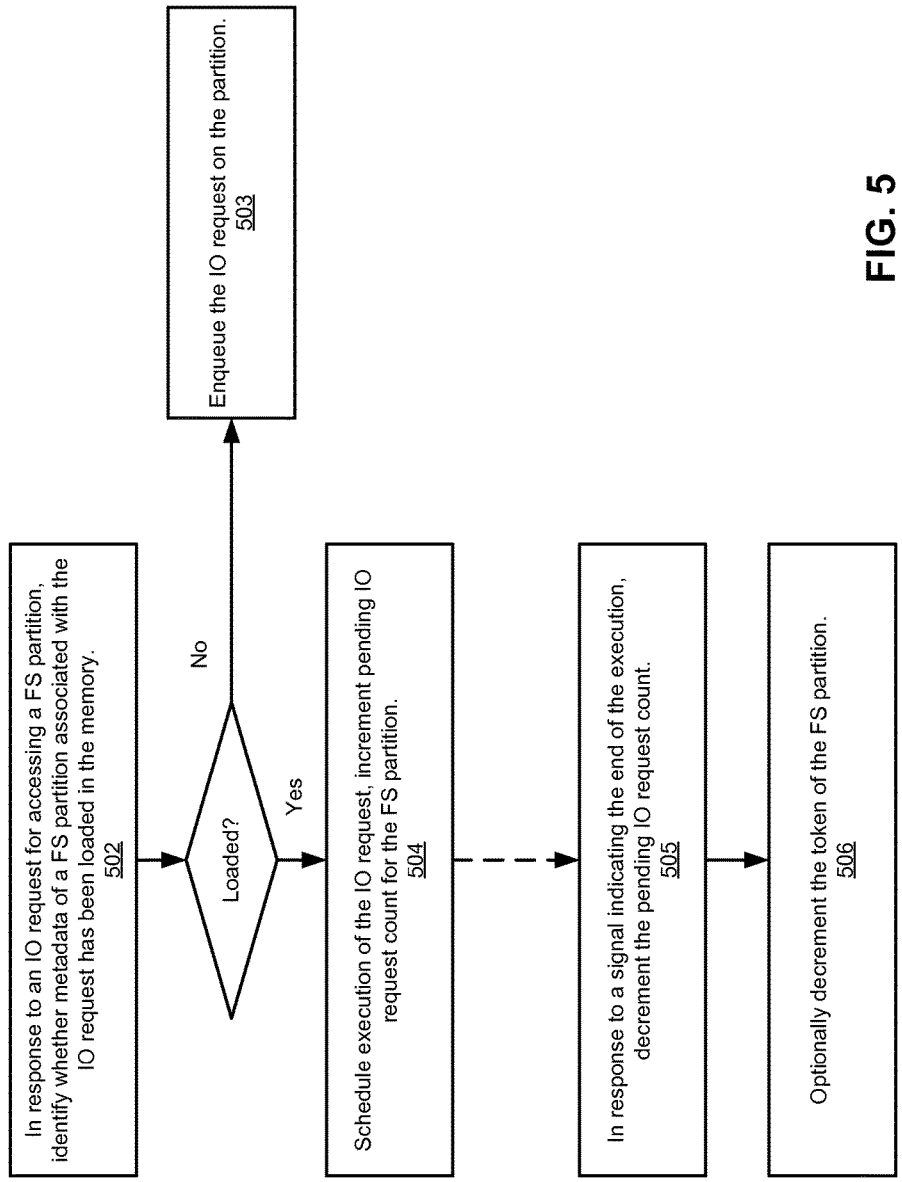
FIG. 5 is a flow diagram illustrating a method for managing resources used by file system partitions of a storage system according to one embodiment of the invention.

FIG. 5 is a flow diagram illustrating a method for managing resources used by file system partitions of a storage system according to one embodiment of the invention. Method 500 may be performed by system 300 of FIG. 3. Referring to FIG. 5, at block 502, in response to a request for accessing an FS partition, it is determined whether metadata associated with the FS partition has been loaded in the memory. If the corresponding FS partition has not been loaded, at block 503, the IO request is enqueued for subsequent execution after the file system partition is loaded into memory. In addition, the corresponding FS partition is scheduled to be loaded (e.g., swapped in).

If the FS partition has been loaded, at block 504, the IO request is scheduled to be executed and the pending IO request count associated with the FS partition is incremented. The pending IO request count represents a number of IO requests currently pending to be executed for the FS partition. Thus, each of the FS partitions is associated with a separate pending IO request count. Subsequently at block 505, when a signal is received indicating that the execution of an IO request has been completed, the pending IO request count is decremented. Optionally at block 506, the token of the FS partition is also decremented. Note that, operations involved in block 501, blocks 502-504, and blocks 505-506 may be performed in different processes or threads, which may be carried out independently and/or substantially concurrently by the operating system.

Figure 6:
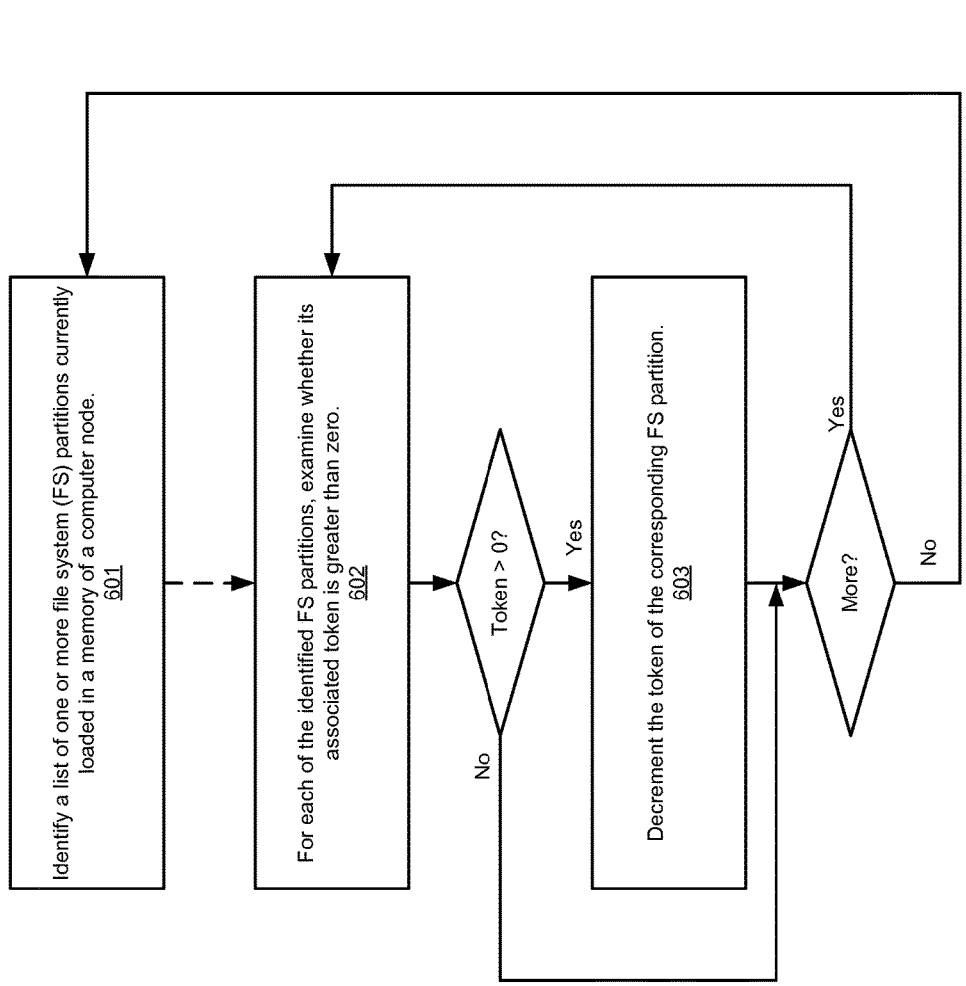
FIG. 6 is a flow diagram illustrating a method for managing resources used by file system partitions of a storage system according to another embodiment of the invention.

FIG. 6 is a flow diagram illustrating a method for managing resources used by file system partitions of a storage system according to another embodiment of the invention. Method 600 may be performed by system 300 of FIG. 3, which may be part of a maintenance or housekeeping thread executed periodically. Referring to FIG. 6, at block 601, a list of one or more FS partitions are identified that are currently loaded in the memory of a storage system. The one or more FS partitions are part of multiple FS partitions collectively represent a single larger logical file system of the storage system. At block 602, for each of the loaded FS partitions, the associated token is examined to determine whether a value of the token reaches a predetermined value such as zero. If not, at block 603, the value of the token is decremented. Once the value of a token of an FS partition reaches zero, the FS partition is considered as a candidate to be swapped out. The above process is iteratively performed for each of the FS partitions loaded in the memory.

Figure 7:
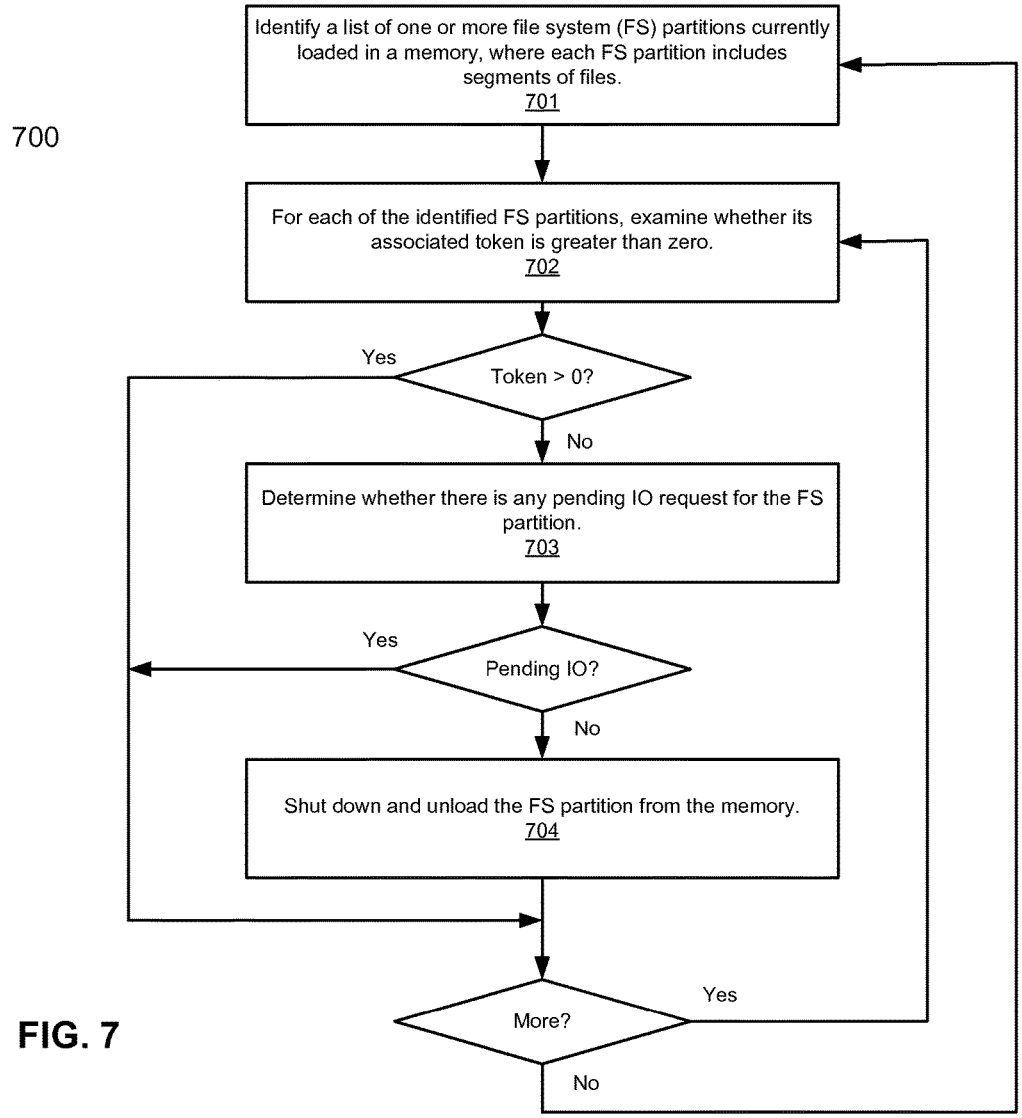
FIG. 7 is a flow diagram illustrating a method for managing resources used by file system partitions of a storage system according to another embodiment of the invention.

FIG. 7 is a flow diagram illustrating a method for managing resources used by file system partitions of a storage system according to another embodiment of the invention. Method 700 may be performed by system 300 of FIG. 3. Referring to FIG. 7, at block 701, a list of one or more FS partitions currently loaded in the memory. At block 702, for each of the loaded FS partitions, the corresponding token is examined to determine whether the value of the token reaches zero. If the value of the token reaches zero, at block 703, it is determined whether there is any IO request pending for the FS partition. If not, at block 704, the FS partition may be shut down and swapped out from the memory. Note that methods 500-700 may be independently and/or substantially concurrently performed via different processes or threads.

According to some embodiments, each of the FS partitions stores segments of files that have similar characteristics such as access patterns. For example, files may be stored in multiple FS partitions based on time attributes of the files. In one embodiment, files that have similar access time such as the last modified time are stored in the same partition. That is, files that have been modified in a similar time frame may be grouped into the same FS partition. The basic idea behind the time-based partitioning scheme is to create partitions based on times of the files. As a specific example, if the file system has 100 files f1 . . . f100 (ordered by the modification time) and ten partitions are created including partitions p1 . . . p10 each having 10 files, then partition p1 would consist of files f1 . . . f10, p2 files f11 . . . f20 and so on.

A file is generally a locality domain i.e. applications usually access parts or whole of a file. By storing the entire contents of files on one partition it reduces partition swaps for accessing a file. In a long term backup/archival workload, files are more likely to be accessed in the order of their modification times. Typical access queries (e.g. during a regulatory enquiry) are of the form of, for example, "produce all the emails sent between dates x and y." Such queries are handled by scanning the files in time order and hence naturally align with time based partitioning of files. Keyword queries such as "produce all files which have words x and y" are answered by first looking up an inverted index structure. Inverted indexes are to organize and return matching files in modification time order because that is the order in which the index structure is incrementally built (e.g., files are inserted into the index as and when they are created/modified).

For a time-based partitioning scheme, the access pattern of partitions under both these workloads will be sequential i.e. all the relevant files from one partition will be accessed before moving on to the next partition. Time-based partitioning of data also gives good deduplication performance. Files created around the same or similar time frame are likely to have more common data as compared to files created distant time apart. A data partitioning scheme should also be easy to setup and maintain. In the time-based partitioning scheme, whenever a file is created or updated it must be written to or moved (from its current partition) to the partition holding the recently modified data. Moving file from one partition to another can be a very costly operation but large classes of workloads (long term archival/backup workloads) are mostly write-once-read-many (WORM), where files are created once when the data is first written and never updated thereafter.

A WORM dataset is ideally suited for a modification time based partitioning scheme. All new data has to be written to only one partition, i.e., the current partition. Once the current partition fills up it can be marked as read-only and another new current partition is created to start filling. Hence, at any point there is only one writable partition and multiple read-only partitions. Writable partitions typically have much bigger memory requirement than read-only partitions and hence having only one writable partition further reduces the memory requirement of the system.

Figure 8:
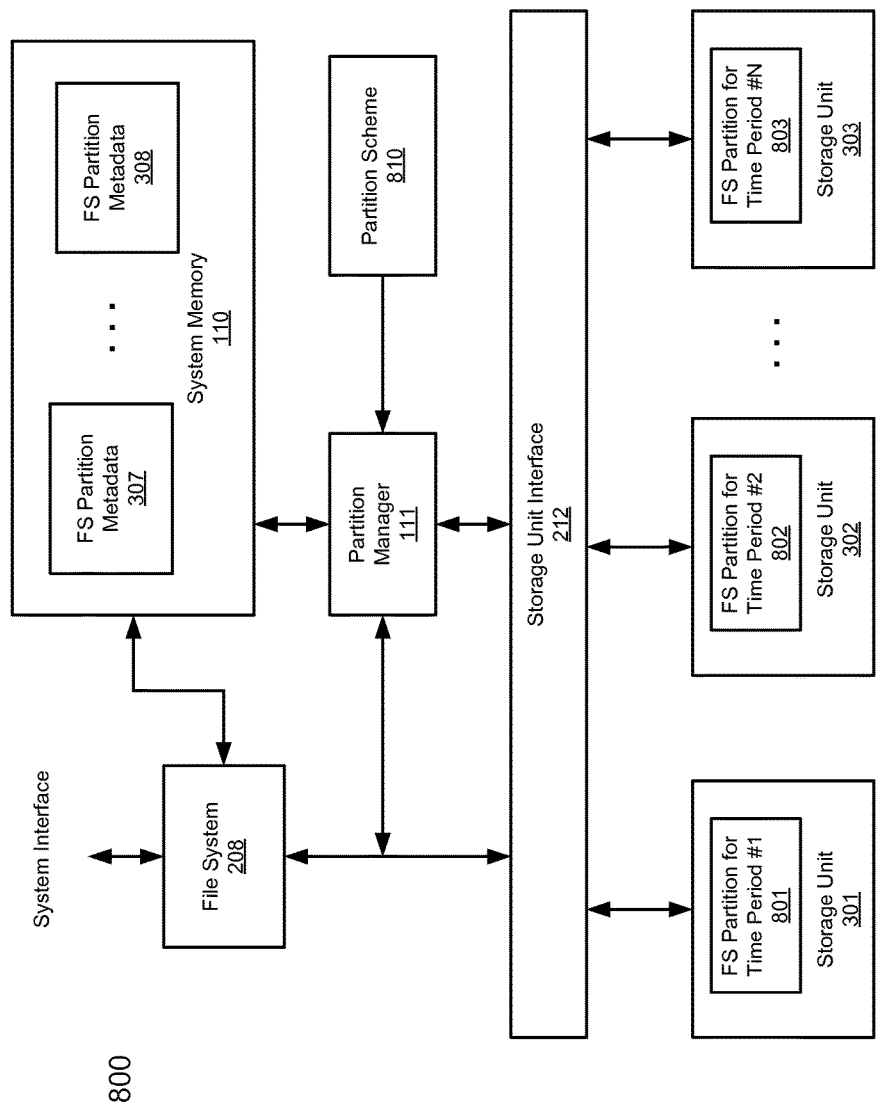
FIG. 8 is a block diagram illustrating a block diagram illustrating a storage system according to another embodiment of the invention.

FIG. 8 is a block diagram illustrating a block diagram illustrating a storage system according to another embodiment of the invention. For example, system 800 may be implemented as part of storage system 104 of FIG. 1. Referring to FIG. 8, similar to system 300 of FIG. 3, partitions 301-303 may represent at least part of partitions 108-109 of FIG. 1. Partitions 301-303 may be implemented within a single computing node. Each of partitions 301-303 is identified by a partition ID that uniquely identifies the corresponding partition. Each of partitions 301-303 further contains metadata that includes enough information access data stored therein independently. System 800 further includes partition manager 111 having the same or similar functionality of the partition manager as shown in FIG. 3. For example, partition manager 111 is configured to swap any one of FS partitions 801-803 in and out of memory 110 as part of FS partition metadata 307-308 according to a swapping or eviction scheme, such as a token-based scheme as described above, such that resources utilized can be managed in an efficient manner.

According to one embodiment, when a file is to be written to one of FS partitions 801-803 of partitions 301-303, the file is written to an FS partition that is selected based on partition algorithm 810, such as, for example, based on the likely future access pattern of the file. In one embodiment, the file may be written to a FS partition based on a time attribute of the file. Since FS partitions 801-803 are defined or grouped based on a time attribute of the files, each of FS partitions 801-803 is literately associated with a specific time period. As described above, files created around the same or similar time frame are likely to be accessed together, As a result, when files are accessed, fewer FS partitions will need to be swapped in and out from memory 110.

A time attribute of a file used for partitioning can be any of last access time attribute 901, last modified time attribute 902, and last status change time attribute 903 of data structure 900 associated with a file as shown in FIG. 9. In one embodiment, the time attribute used for partitioning can be the creation time of the file. The data structure 900 represents a part of an inode of a standard file system data structure. Modes are used to store information about a file, where the data blocks are structures used to store the actual data for the file. The information contained in an inode may include, for example, ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file.

Referring back to FIG. 8, according to one embodiment, system 800 is an archiving system, where external or fresh user data is normally written to partition 801 as an active partition. Data stored in partition 801 may be migrated to partition 802 which is the target partition. When partition 802 fills up, partition 802 is sealed and becomes an archived partition 803 (e.g., read-only partition). Another partition is allocated to be the new target partition. According to one embodiment, during the data migration, files stored in an active partition (e.g., partition 801) are scanned based on a time attribute (e.g., last modified time attribute) of the files and are transferred to a target partition (e.g., partition 802), such that files stored in the target partition were last modified in a similar time frame.

Figure 10:
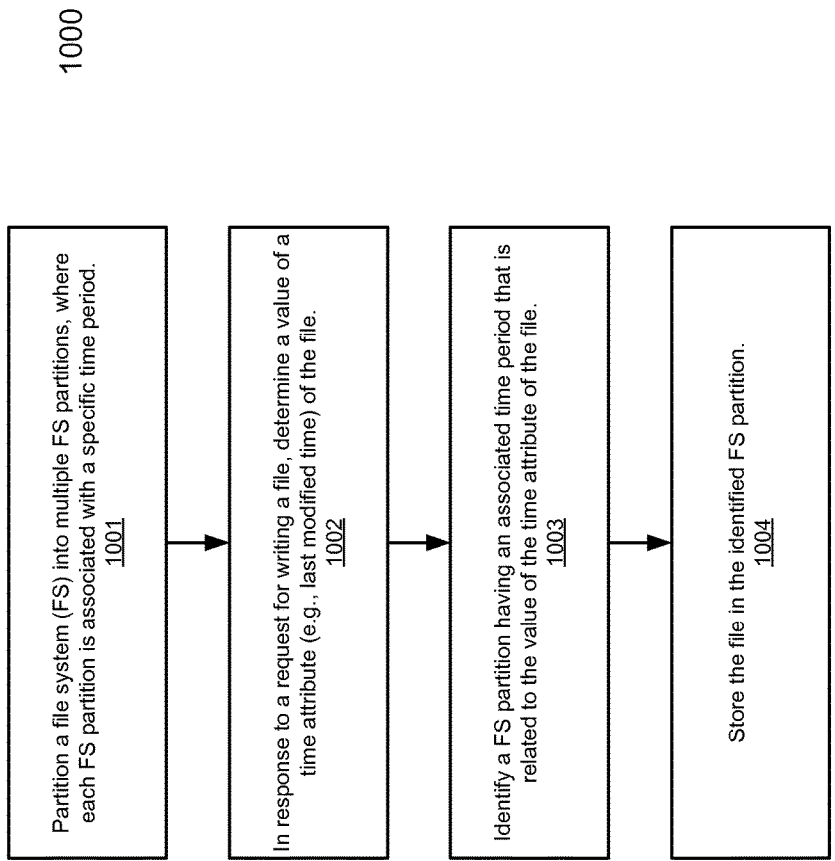
FIG. 10 is a flow diagram illustrating a method for partitioning a file system according to one embodiment of the invention.

FIG. 10 is a flow diagram illustrating a method for partitioning a file system according to one embodiment of the invention. Method 1000 may be performed by system 800 of FIG. 8. Referring to FIG. 10, at block 1001, a file system of a storage system is partitioned into multiple FS partitions. Each FS partition is associated with a specific time period. In response to a request for writing a file, at block 1002, a time attribute of the file is determined. In one embodiment, the time attribute is the last modified time attribute of the file. At block 1003, an FS partition is identified based on the time attribute of the file. At block 1004, the file is stored in the identified FS partition.

Figure 11:
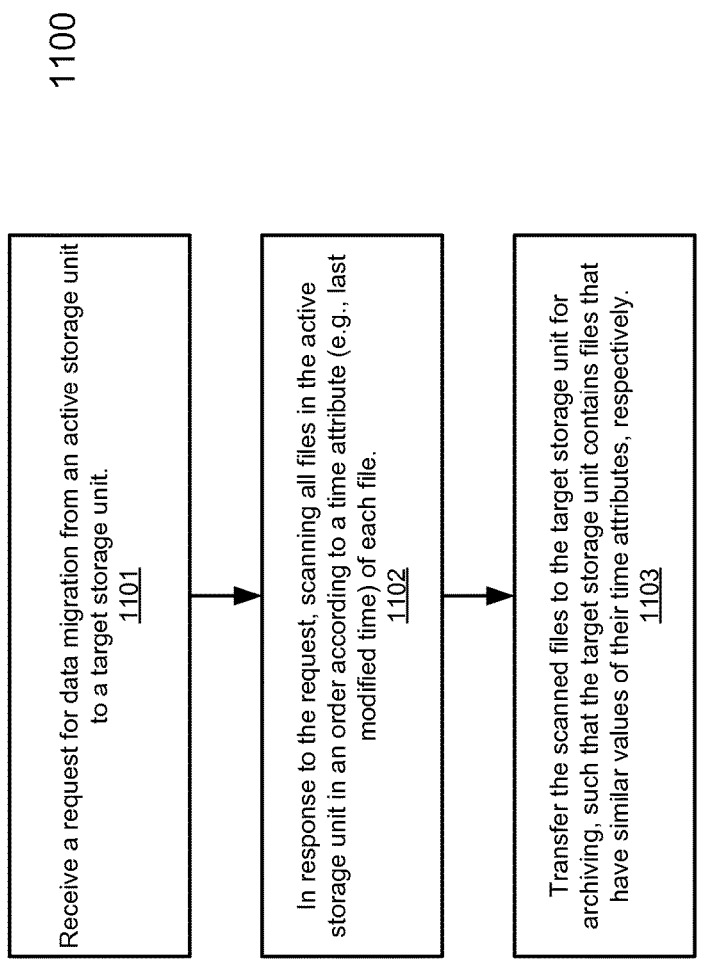
FIG. 11 is a flow diagram illustrating a method for partitioning a file system according to another embodiment of the invention.

FIG. 11 is a flow diagram illustrating a method for partitioning a file system according to another embodiment of the invention. Method 1100 may be performed by system 800 of FIG. 8. Referring to FIG. 11, at block 1101, a request is received for data migration from an active partition to a target partition. Each of the active and target partitions contains segments of files that are deduplicated across the partitions. In response to the request, at block 1102, all files stored in the active partition are scanned in an order according to a time attribute (e.g., last modified time attribute) of the files. At block 1103, the scanned files are transferred from the active partition to the target partition for archiving, such that the target partition contains files that have a similar access pattern.

Figure 12:
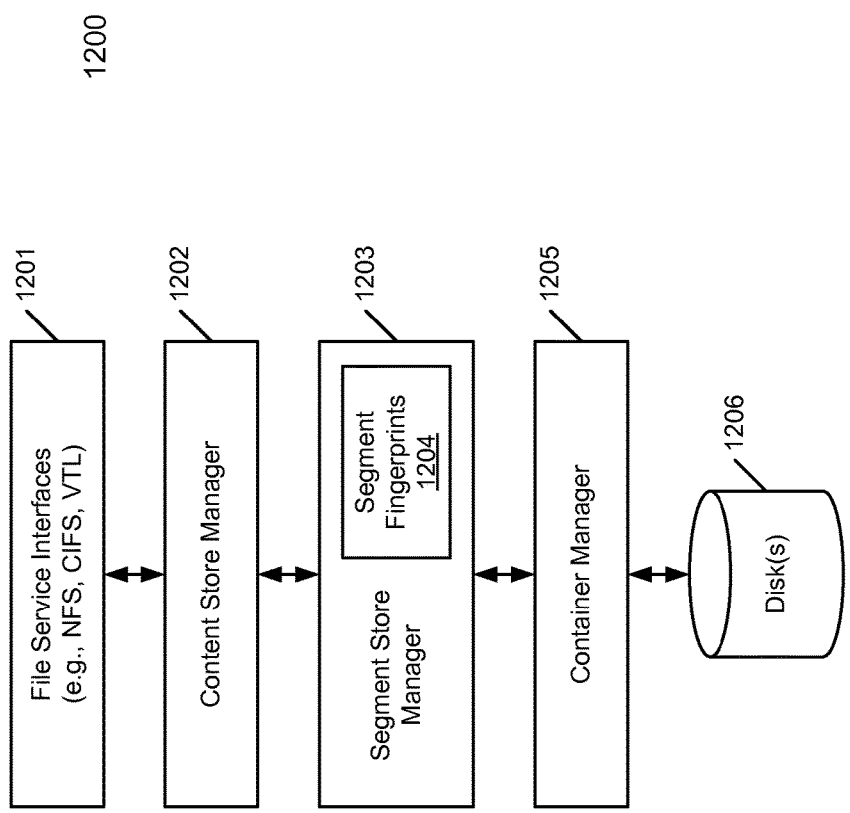
FIG. 12 is a block diagram illustrating an example of a data storage system which may be used with an embodiment of the invention.

FIG. 12 is a block diagram illustrating an example of a data storage system which may be used with an embodiment of the invention. For example, system 1200 may be implemented as part of a storage system as shown in FIG. 1. In this example, system 1200 is a deduplicating data storage system. Referring to FIG. 12, system 1200 includes, but it is not limited to, file service interface 1201, content store manager 1202, segment store manager 1203 having segment fingerprints 1204, and container manager 1405 for managing segments stored in containers in disk or disks 1206.

According to one embodiment, system 1200 breaks a data object (e.g., a file) into variable-length segments in a content dependent manner and computes a fingerprint for each segment. System 1200 uses the fingerprints both to identify duplicate segments and as part of a segment descriptor used to reference a segment. It represents files as sequences of segment fingerprints. During writes, system 1200 identifies duplicate segments and does its best to store only one copy of any particular segment. Before storing a new segment, system 1200 may use a variety of compression algorithm, such as a variation of the Ziv-Lempel algorithm, to compress the segment. In one embodiment, system 1200 supports multiple access protocols which are layered on a common file services interface 1201. Supported protocols include a network file system (NFS), a common Internet file system (CIFS), and a virtual tape library interface (VTL), etc. System 1200 includes an administrative interface for managing the system. The administrative interface may be a part of file services interface 1201.

When a data stream enters system 1200, it goes through one of the standard interfaces to the generic file services layer, which manages the name space and file metadata. The file services layer forwards write requests to content store manager 1202 which manages the data content within a file. Content store manager 1202 breaks a data stream into segments, uses segment store manager 1203 to perform deduplication, and keeps track of the references for a file (e.g., mapping between logical data objects and physical data objects). Segment store manager 1203 does the actual work of deduplication. It packs deduplicated (unique) segments into relatively large units, compresses such units using a variation of compression algorithms, such as a Ziv-Lempel algorithm, to further compress the data, and then writes the compressed results into containers managed by container manager 1205.

To read a data stream from system 1200, a client drives the read operation through one of the standard interfaces and the file services layer 1201. Content store manager 1202 uses references to deduplicated segments to deliver the desired data stream to the client. Segment store manager 1203 prefetches, decompresses, reads and caches data segments from container manager 1205. According to one embodiment, content store manager 1202 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store manager 1202 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments. To read a range of bytes in an object, content store manager 1202 traverses a tree of segments created by the segment mapping operation above to obtain the segment descriptors for the relevant segments. It fetches the segments from a segment store (not shown) and returns the requested byte range to the client.

Segment store manager 1203 essentially manages a database of segments keyed by their segment descriptors 1204. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variety of compression algorithms such as a variation of the Ziv-Lempel algorithm. A container, when fully packed, is appended to container manager 1205. Finally, segment indexing updates the segment index that maps segment descriptors to the container holding the segment, after the container has been appended to container manager 1205. To read a data segment, segment store manager 1203 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 1205. Container unpacking decompresses the retrieved portion of the container and returns the requested data segment.

The container manager 1205 provides a storage container log abstraction, not a block abstraction, to segment store 1203. A container includes a metadata section having the segment descriptors for the stored segments. They are immutable in that new containers can be appended and old containers deleted, but containers cannot be modified once written. When segment store manager 1203 appends a container, the container manager 1205 returns a container ID which is unique over the life of the system. The container manager 1205 is responsible for allocating, deallocating, reading, writing and reliably storing containers. It supports reads of the metadata section or a portion of the data section, but it only supports appends of whole containers. If a container is not full but needs to be written to disk, it is padded out to its full size. Container manager 1205 is built on top of standard block storage 1206. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer. According to one embodiment, certain components of system 1200, such as file service interface, include a logic configured to examine whether a particular request received could possibly compromise the integrity of an immutable data object and to request the necessary approval from an authorization agent for such a request, using the techniques set forth above. Other configurations may also exist.

Figure 13:
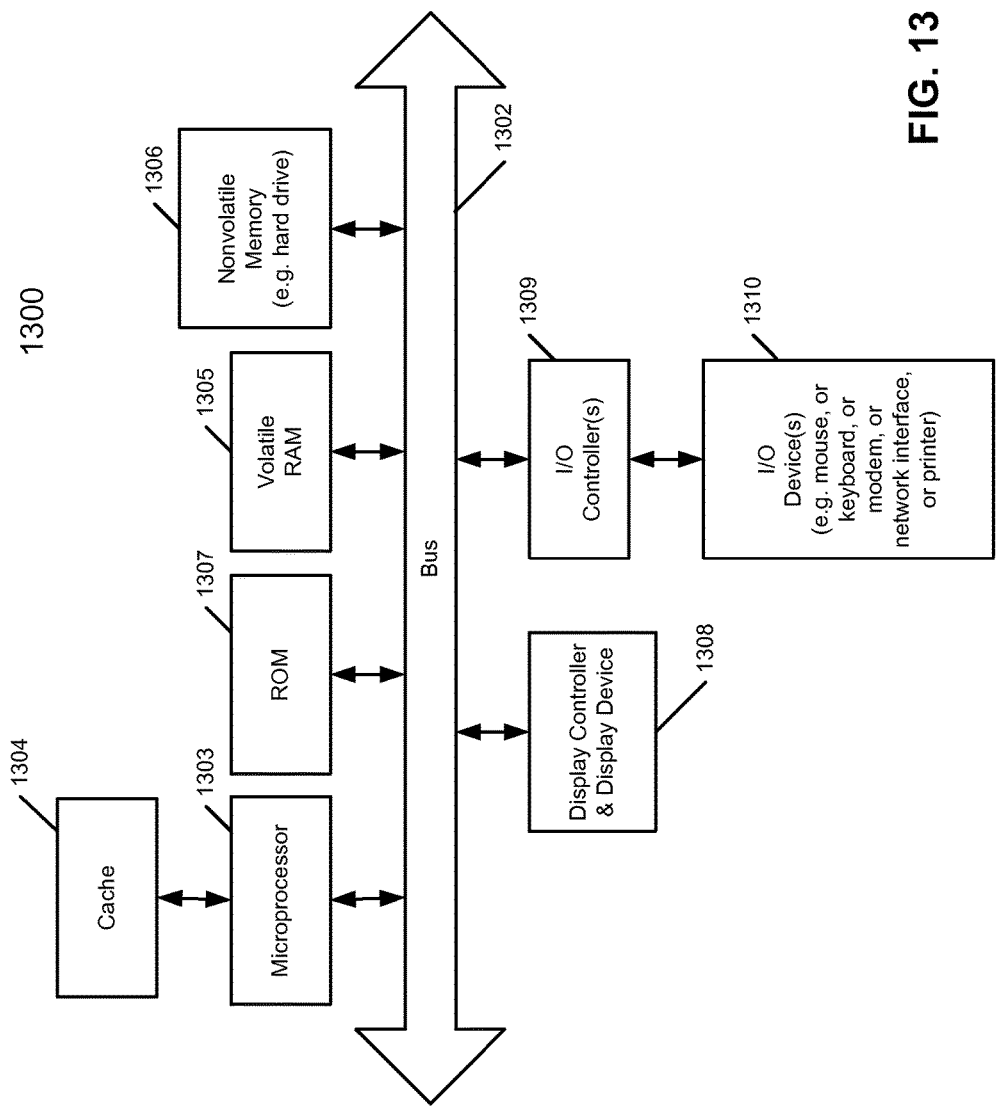
FIG. 13 is a block diagram of a data processing system which may be used with one embodiment of the invention.

FIG. 13 is a block diagram of a data processing system which may be used with one embodiment of the invention. For example, system 1300 may be used as a client or server computer as shown in FIG. 1. Note that while FIG. 13 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 13 may, for example, be an Apple Macintosh computer or an IBM compatible PC.

As shown in FIG. 13, the computer system 1300, which is in a form of a data processing system, includes a bus or interconnect 1302 coupled to a processor 1303 and a ROM 1307, a volatile RAM 1305, and a non-volatile memory 1306. Processor 1303 may include multiple processors and/or core logics that constitute central processing units (CPUs) of the system and thus, control the overall operations of the system. According to certain embodiments, processor 1303 accomplish this by executing software stored in any of the memories 1305-1307, such as, for example, applications and operating system, etc. Processor 1303 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 1303, which may be, for example, an Intel processor or a PowerPC processor, is coupled to cache memory 1304 as shown in the example of FIG. 13. The bus 1302 interconnects these various components together and also interconnects these components 1303 and 1305-1307 to a display controller and display device 1308, as well as to input/output (I/O) devices 1310, which may be mice, keyboards, modems, network interfaces, printers, and other devices which are well-known in the art.

Typically, the input/output devices 1310 are coupled to the system through input/output controllers 1309. The volatile RAM 1305 is typically implemented as dynamic RAM (DRAM) which requires power continuously in order to refresh or maintain the data in the memory. The non-volatile memory 1306 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 13 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1302 may include one or more buses connected to each other through various bridges, controllers, and/or adapters, as is well-known in the art. In one embodiment, the I/O controller 1309 includes a USB (Universal Serial Bus) adapter for controlling USB peripherals. Alternatively, I/O controller 1309 may include an IEEE-1394 adapter, also known as FireWire adapter, for controlling FireWire devices. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing a file system, the method comprising:
   partitioning a file system (FS) of a storage system into a plurality of FS partitions by a FS partition manager executed by a processor of the storage system, each FS partition storing a plurality of files, wherein the plurality of FS partitions form a single logical file system using a single name space, wherein each of the FS partitions stores files having similar access patterns;
   receiving an input and output (IO) request for accessing a first of the FS partitions, the first FS partition providing access to a first set of files;
   in response to the IO request, selecting by the FS partition manager a second of the FS partitions that is currently in a ready state for access and that has no pending IO request for the second FS partition, the second FS partition providing access to a second set of files;
   removing by the FS partition manager the second FS partition from the ready state for access, including unloading second FS metadata associated with the second FS partition from a system memory of the storage system, wherein the second FS metadata includes information for accessing the second set of files;
   bringing the first FS partition into a ready state for access, including loading first FS metadata associated with the first FS partition into the system memory for servicing the IO request, wherein the first FS metadata includes information for accessing the first set of files, including
      enqueuing the request in a pending IO queue of the file system if the first FS partition is not in the ready state for access,
      scheduling an execution of the IO request if the first FS partition is in the ready state for access, and
      incrementing a pending IO count associated with the first FS partition to indicate a number of IO requests currently pending for execution in the first FS partition; and
   providing access to the first set of files via the first FS partition of the storage system and via the first FS metadata associated with the first FS partition loaded into the system memory, while the second FS metadata associated with the second FS partition is unloaded from the system memory, such that a memory space of the system memory required to store FS metadata is less than the system memory required to concurrently store both the first and the second FS metadata, wherein the first FS metadata includes information for accessing the first set of files, wherein the second FS metadata includes information for accessing the second set of files.

2. The method of claim 1, wherein the first FS metadata includes name and directory information for accessing the files associated with the first FS partition, and wherein the second FS metadata includes name and directory information for accessing the files associated with the second FS partition.

3. The method of claim 1, wherein removing the second FS partition from the ready state for access includes powering down a storage device associated with the second FS partition, and wherein bringing the first FS partition into the ready state for access includes powering up a storage device associated with the first FS partition.

4. The method of claim 1, wherein the files stored in each FS partition are deduplicated within the FS partition.

5. The method of claim 1, further comprising decrementing the pending IO count in response to a signal indicating that execution of the IO request has been completed.

6. The method of claim 1, further comprising:
   assigning a token having an initial value to the first FS partition when the first FS partition is being loaded; and
   decrementing the value of the token associated with the first FS partition in response to the signal indicating a complete execution of the IO request.

7. The method of claim 6, further comprising periodically decrementing the value of the token associated with the first FS partition.

8. The method of claim 7, further comprising removing the first FS partition from the ready state for access if at least one of the pending IO count and the value of the token reaches a predetermined value.

9. The method of claim 1, wherein the second FS partition is removed from the ready state for access only if there is no IO request pending for the second FS partition and the second FS partition has been in the ready state for access for a predetermined period of time.

10. The method of claim 1, wherein files with similar access patterns include files with similar last modified times such that FS partitions of the storage system are accessed sequential so relevant files from one partition is accessed before moving on to the next partition.

11. The method of claim 1, further comprising writing a file to a FS partition in a ready state, wherein the FS partition is selected based on a likely future access pattern of the file.

12. A non-transitory computer-readable storage medium having instructions stored therein, which when executed by a computer, cause the computer to perform operations for managing resources of a file system, the operations comprising:
   partitioning a file system (FS) of a storage system into a plurality of FS partitions by a FS partition manager executed by a processor of the storage system, each FS partition storing a plurality of files, wherein the plurality of FS partitions form a single logical file system using a single name space, wherein each of the FS partitions stores files having similar access patterns;
   receiving an input and output (IO) request for accessing a first of the FS partitions, the first FS partition providing access to a first set of files;
   in response to the IO request, selecting a second of the FS partitions that is currently in a ready state for access and that has no pending IO request for the second FS partition, the second FS partition providing access to a second set of files;
   removing the second FS partition from the ready state for access, including unloading second FS metadata associated with the second FS partition from a system memory of the storage system, wherein the second FS metadata includes information for accessing the second set of files;
   bringing the first FS partition into a ready state for access, including loading first FS metadata associated with the first FS partition into the system memory for servicing the IO request, wherein the first FS metadata includes information for accessing the first set of files, including
      enqueuing the request in a pending IO queue of the file system if the first FS partition is not in the ready state for access,
      scheduling an execution of the IO request if the first FS partition is in the ready state for access, and
      incrementing a pending IO count associated with the first FS partition to indicate a number of IO requests currently pending for execution in the first FS partition; and
   providing access to the first set of files via the first FS partition of the storage system and via the first FS metadata associated with the first FS partition loaded into the system memory, while the second FS metadata associated with the second FS partition is unloaded from the system memory, such that a memory space of the system memory required to store FS metadata is less than the system memory required to concurrently store both the first and the second FS metadata, wherein the first FS metadata includes information for accessing the first set of files, wherein the second FS metadata includes information for accessing the second set of files.

13. The computer-readable storage medium of claim 12, wherein the first FS metadata includes name and directory information for accessing the files associated with the first FS partition, and wherein the second FS metadata includes name and directory information for accessing the files associated with the second FS partition.

14. The computer-readable storage medium of claim 12, wherein removing the second FS partition from the ready state for access includes powering down a storage device associated with the second FS partition, and wherein bringing the first FS partition into the ready state for access includes powering up a storage device associated with the first FS partition.

15. The computer-readable storage medium of claim 12, wherein the files stored in each FS partition are deduplicated within the FS partition.

16. The computer-readable storage medium of claim 12, wherein the operations further comprise decrementing the pending IO count in response to a signal indicating that execution of the IO request has been completed.

17. The computer-readable storage medium of claim 12, wherein the operations further comprise:
   assigning a token having an initial value to the first FS partition when the first FS partition is being loaded; and
   decrementing the value of the token associated with the first FS partition in response to the signal indicating a complete execution of the IO request.

18. The computer-readable storage medium of claim 16, wherein the operations further comprise periodically decrementing the value of the token associated with the first FS partition.

19. The computer-readable storage medium of claim 18, wherein the operations further comprise removing the first FS partition from the ready state for access if at least one of the pending IO count and the value of the token reaches a predetermined value.

20. The computer-readable storage medium of claim 12, wherein the second FS partition is removed from the ready state for access only if there is no IO request pending for the second FS partition and the second FS partition has been in the ready state for access for a predetermined period of time.

21. A storage system, comprising:
   a system memory;
   a processor;
   a file system (FS) executed in the system memory by the processor, the file system having a plurality of FS partitions, each FS partition storing a plurality of files, wherein the plurality of FS partitions form a single logical file system using a single name space, wherein each of the FS partitions stores files having similar access patterns;
   a partition manager coupled to the file system and the system memory, wherein the partition manager is configured to
      receive an input and output (IO) request for accessing a first of the FS partitions, the first FS partition providing access to a first set of files,
      in response to the IO request, select a second of the FS partitions that is currently in a ready state for access and that has no pending IO request for the second FS partition, the second FS partition providing access to a second set of files,
      remove the second FS partition from the ready state for access, including unloading second FS metadata associated with the second FS partition from a system memory of the storage system, wherein the second FS metadata includes information for accessing the second set of files,
      bring the first FS partition into a ready state for access, including loading first FS metadata associated with the first FS partition into the system memory for servicing the IO request, wherein the first FS metadata includes information for accessing the first set of files, including enqueuing the request in a pending IO queue of the file system if the first FS partition is not in the ready state for access, scheduling an execution of the IO request if the first FS partition is in the ready state for access, and incrementing a pending IO count associated with the first FS partition to indicate a number of IO requests currently pending for execution in the first FS partition, and provide access to the first set of files via the first FS partition of the storage system and via the first FS metadata associated with the first FS partition loaded into the system memory, while the second FS metadata associated with the second FS partition is unloaded from the system memory, such that a memory space of the system memory required to store FS metadata is less than the system memory required to concurrently store both the first and the second FS metadata, wherein the first FS metadata includes information for accessing the first set of files, wherein the second FS metadata includes information for accessing the second set of files.

22. The system of claim 21, wherein the first FS metadata includes name and directory information for accessing the files associated with the first FS partition, and wherein the second FS metadata includes name and directory information for accessing the files associated with the second FS partition.

23. The system of claim 21, wherein in removing the second FS partition from the ready state for access the partition manager is to power down a storage device associated with the second FS partition, and wherein in bringing the first FS partition into the ready state for access the partition manager is to power up a storage device associated with the first FS partition.

24. The system of claim 21, wherein the files stored in each FS partition are deduplicated within the FS partition.

25. The system of claim 21, wherein the partition manager is further to decrement the pending IO count in response to a signal indicating that execution of the IO request has been completed.

26. The system of claim 21, wherein the partition manager is further to:

assign a token having an initial value to the first FS partition when the first FS partition is being loaded, and decrement the value of the token associated with the first FS partition in response to the signal indicating a complete execution of the IO request.

27. The system of claim 26, wherein the partition manager is further to periodically decrement the value of the token associated with the first FS partition.

* * * * *